(12) United States Patent
Lawson

(10) Patent No.: US 12,517,356 B1
(45) Date of Patent: Jan. 6, 2026

(54) SYSTEMS AND METHODS FOR MEASURING DELAY IN REPRESENTING HEAD MOTION IN A VIRTUAL ENVIRONMENT

(71) Applicant: TRU Simulation + Training, Lutz, FL (US)

(72) Inventor: Matthew Edward Lawson, Wesley Chapel, FL (US)

(73) Assignee: TRU SIMULATION + TRAINING, Lutz, FL (US)

( * ) Notice: Subject to any disclaimer, the term of this patent is extended or adjusted under 35 U.S.C. 154(b) by 0 days.

(21) Appl. No.: 18/886,768

(22) Filed: Sep. 16, 2024

(51) Int. Cl.
*G01M 11/08* (2006.01)
*G01M 99/00* (2011.01)
*G02B 27/01* (2006.01)
*G06F 3/01* (2006.01)
*G06T 19/20* (2011.01)

(52) U.S. Cl.
CPC ........... *G02B 27/017* (2013.01); *G06F 3/012* (2013.01); *G06T 19/20* (2013.01)

(58) Field of Classification Search
CPC ...................................................... G06F 3/011
See application file for complete search history.

(56) References Cited

U.S. PATENT DOCUMENTS

| 9,807,384 | B1 | 10/2017 | Jokinen et al. | |
|---|---|---|---|---|
| 2007/0121423 | A1* | 5/2007 | Rioux | G01V 1/22 367/69 |
| 2013/0171596 | A1* | 7/2013 | French | G09B 19/00 434/236 |
| 2015/0073692 | A1* | 3/2015 | Malikopoulos | B60W 50/14 701/123 |
| 2018/0003979 | A1* | 1/2018 | Nakashima | G02B 27/017 |
| 2018/0364131 | A1* | 12/2018 | Jokinen | G01M 99/004 |
| 2019/0101977 | A1* | 4/2019 | Armstrong-Muntner | G06N 20/00 |

(Continued)

OTHER PUBLICATIONS

Anonymous, "Measuring Head-Mounted Displays (HMD) Motion-To-Photon (MTP) Latency," OptoFidelity, May 20, 2021 (May 20, 2021), XP093264716, pp. 1-6, Retrieved from the Internet: URL: https://web.archive.org/web/20240413090204/https://www.optofidelity.com/insights/blogs/measuring-head-mounted-displays-hmd-motion-to-photon-mtp-latency, [retrieved on Mar. 28, 2025] pp. 1-3.

(Continued)

*Primary Examiner* — Nan-Ying Yang
(74) *Attorney, Agent, or Firm* — SLATER MATSIL, LLP

(57) ABSTRACT

A method, apparatus, system and medium are provided. The method includes generating a virtual environment of a test scenario for a head mounted display (HMD) mounted to a model head on a test stand, where the virtual environment includes at least a first shape and a second shape, moving the model head on the test stand, receiving, by a data acquisition system (DAQ), from an accelerometer mounted on the model head, changed signaling indicating the movement of the model head, updating the virtual viewpoint of the HMD based on the movement of the model head, displaying the updated virtual viewpoint in the HMD, receiving, by the DAQ, from a light sensor mounted on the model head, changed signaling based on displaying the updated virtual viewpoint in the HMD, and generating, by the DAQ, a data file encoding the signaling from the accelerometer and the light sensor.

19 Claims, 8 Drawing Sheets

(56) References Cited

U.S. PATENT DOCUMENTS

2021/0046391 A1* 2/2021 Board .................... A63G 31/16
2021/0211826 A1* 7/2021 Redmann ................ G06F 3/013

OTHER PUBLICATIONS

Seo, Min-Woo et al., "Photosensor-Based Latency Measurement System Head-Mounted Displays," Sensors, vol. 17, No. 5, May 15, 2017 (May 15, 2017), XP093264368, total pp. 13.

* cited by examiner

SYSTEMS AND METHODS FOR MEASURING DELAY IN REPRESENTING HEAD MOTION IN A VIRTUAL ENVIRONMENT

TECHNICAL FIELD

The present invention relates generally to measuring viewpoint fidelity for a head mounted display, and in particular embodiments, to measuring and quantifying delay in representing head motion of a flight simulation involving a head mounted display.

BACKGROUND

Flight simulator technology has evolved with the incorporation of head-mounted displays (HMDs), bringing new challenges and opportunities for creating immersive training environments. Such simulations involve a blend of sophisticated hardware and software solutions to ensure a realistic and effective simulation experience.

At the core of these systems are advanced motion facilitating and tracking technologies, including the use of such technologies to provide the realistic output for displaying to the HMD and otherwise. Such technologies typically combine optical systems using cameras and sensors with inertial measurement units, providing precise head position and orientation data. This tracking is crucial for rendering accurate visuals in the HMD as the user moves within a training apparatus.

Determining transience of errors introduced to a viewpoint associated with user movement, however, has remained challenging to ensure that simulated viewpoints remain accurate to an acceptable level. Embodiments of the present disclosure include methods, devices, and non-transitory computer-readable storage media that utilize particular elements to overcome these challenges to measure viewpoint fidelity in a head mounted display to determine and/or test HMD error(s), for example with respect to viewpoint transition delay of a HMD, in one or more test directions.

SUMMARY OF THE INVENTION

Technical advantages are generally achieved by embodiments of this disclosure which describe measuring viewpoint fidelity in a head mounted display.

In accordance with a first aspect of the disclosure, a method is provided. An example method includes generating a virtual environment of a test scenario for a head mounted display (HMD) mounted to a model head on a test stand, where the virtual environment includes at least a first shape and a second shape, where the first shape is a sphere surrounding a first virtual viewpoint and the second shape is a shape that precisely fills a virtual field of view from the first virtual viewpoint, and the virtual viewpoint of the virtual environment is configured to shift in response to movement of the HMD secured to the model head, moving the model head on the test stand along a first degree of freedom from a starting position to a final position, receiving, by a data acquisition system (DAQ), from an accelerometer mounted on the model head, changed signaling indicating the movement of the model head, updating the virtual viewpoint of the HMD based on the movement of the model head, displaying the updated virtual viewpoint in the HMD, receiving, by the DAQ, from a light sensor mounted on the model head, changed signaling based on displaying the updated virtual viewpoint in the HMD, and generating, by the DAQ, a data file encoding the signaling from the accelerometer and the light sensor.

In a second aspect of the disclosure an apparatus is provided. An example apparatus includes one or more processors, and at least one non-transitory computer readable memory connected to the one or more processors and including computer program code, where the at least one non-transitory computer readable memory and the computer program code are configured, with the one or more processors, to cause the apparatus to at least, generate a virtual environment for a head mounted display (HMD) mounted to a model head on a test stand, where the virtual environment includes at least a first shape and a second shape, where the first shape is a sphere surrounding a first virtual viewpoint and the second shape is a shape that precisely fills a virtual field of view from the first virtual viewpoint, and the virtual viewpoint of the virtual environment is configured to shift in response to movement of the HMD secured to the model head, receive, by a data acquisition system (DAQ), from an accelerometer mounted on the model head, based on movement of the model head on the test stand along a first degree of freedom from a starting position to a final position, changed signaling indicating the movement of the model head, update the virtual viewpoint of the HMD based on the movement of the model head, display the updated virtual viewpoint in the HMD, receive, by the DAQ, from a light sensor mounted on the model head, changed signaling based on displaying the updated virtual viewpoint in the HMD, and generate, by the DAQ, a data file encoding the signaling from the accelerometer and the light sensor.

In a third aspect of the disclosure, a non-transitory computer-readable storage medium is provided. In some examples, the non-transitory computer-readable storage medium includes has computer program instructions stored on it that, when executed by at least one processor, causes a device to perform generating a virtual environment for a head mounted display (HMD) mounted to a model head on a test stand, where the virtual environment includes at least a first shape and a second shape, where the first shape is a sphere surrounding a first virtual viewpoint and the second shape is a shape that precisely fills a virtual field of view from the first virtual viewpoint, and the virtual viewpoint of the virtual environment is configured to shift in response to movement of the HMD secured to the model head, receiving, by a data acquisition system (DAQ), from an accelerometer mounted on the model head, based on movement of the model head on the test stand along a first degree of freedom from a starting position to a final position, changed signaling indicating the movement of the model head, updating the virtual viewpoint of the HMD based on the movement of the model head, displaying the updated virtual viewpoint in the HMD, receiving, by the DAQ, from a light sensor mounted on the model head, changed signaling based on displaying the updated virtual viewpoint in the HMD, and generating, by the DAQ, a data file encoding the signaling from the accelerometer and the light sensor.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
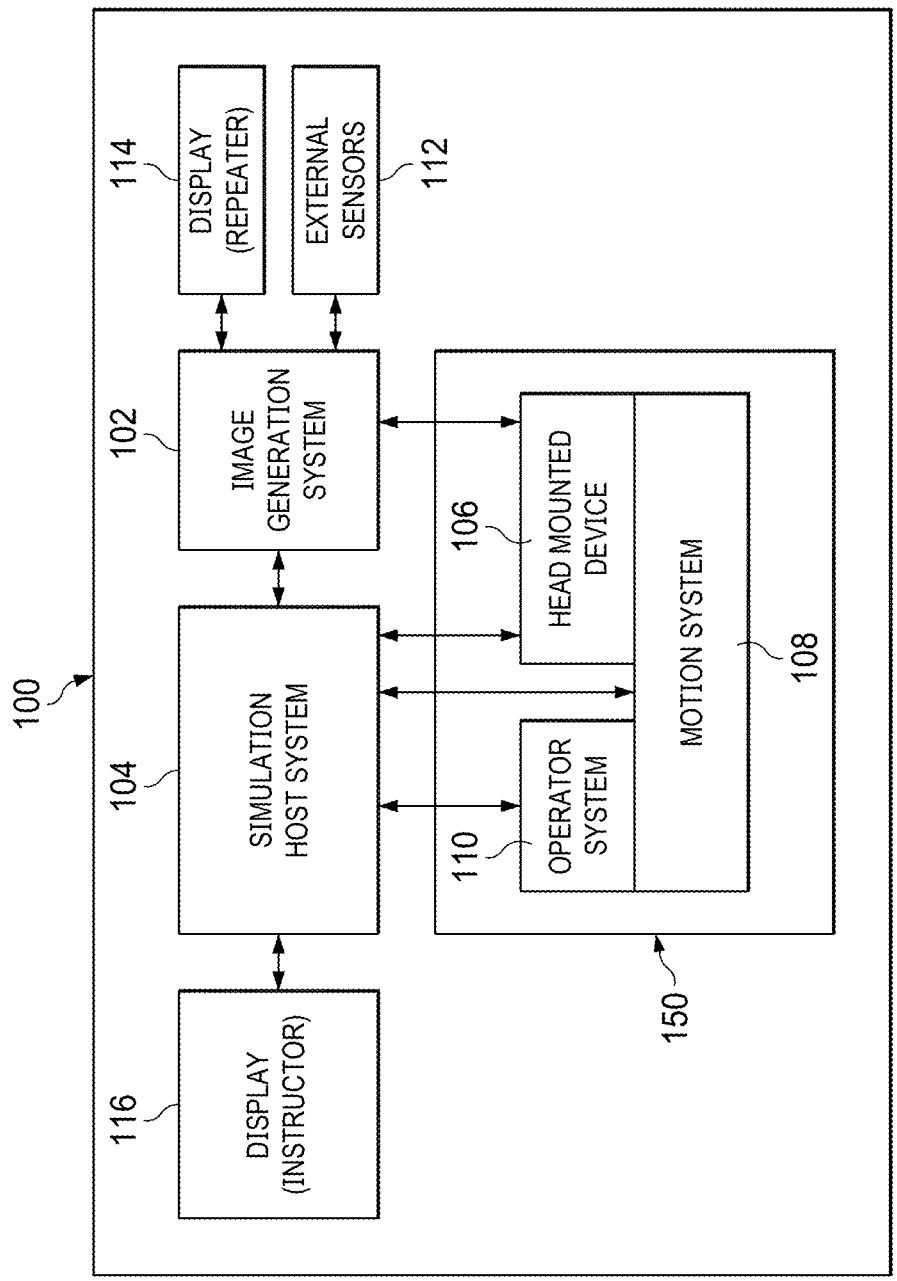
FIG. 1 a block diagram illustrating an HMD flight simulator system in accordance with at least one aspect of the disclosure.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions, and/or alterations can be made herein without departing from the spirit and scope of this disclosure as defined by the appended claims.

Simulating a virtual environment involves generating and depicting virtualized versions of real-world objects, items, and environments that are output to a display for depicting to a user. A head mounted display (HMD) may be utilized by a user to provide realistic input/output to a display, and/or otherwise immerse a user in the simulation to provide a more realistic simulation experience. For example, the HMD may be worn by the user such that as the user performs a movement (e.g., rotates and/or otherwise repositions their head), a viewpoint of a virtual environment that is displayed is updated based on the movement performed.

In various contexts, including simulation of vehicle movements such as aerial vehicles, additional specialized hardware and/or software components may be utilized for any of a myriad of purposes. Particular hardware and/or software components in some contexts are provided that match real-world controls of the particular context. For example, in one such context where a simulation is provided for controlling a particular aerial vehicle (e.g., a flight simulator for training a pilot on a particular aerial vehicle), specialized hardware that matches the exact controls of the particular aerial vehicle may be provided as part of the training apparatus. The training apparatus may also include a motion cueing system that manipulates the training apparatus along with the user within. For example, a motion cueing system may affect the training apparatus to simulate movement effects based on the inputs provided by the user through any of a myriad of controls, such as movements in any one or more of 6 degrees of freedom or combination thereof. In certain contexts, such as using a training apparatus to simulate piloting a particular aerial vehicle during training of a pilot for that aerial vehicle, maintaining a realistic virtual environment and viewpoint is particularly desirable to ensure that the training performed will accurately map to the pilot's real-world experience in controlling the particular aerial vehicle.

Motion sickness in virtual reality (VR) is also a common issue where users experience symptoms such as dizziness, nausea, and disorientation. This condition arises from a disconnect between the visual information perceived by the eyes and the body's sense of movement, leading to sensory conflict. Mismatch between physical movement and the lack of corresponding perceived motion in the virtual world, or movement counter to the rendered VR movement, can confuse the brain, resulting in motion sickness.

The severity of motion sickness in VR can vary depending on several factors, including the design of the VR experience (e.g., latency and mismatch between reality and VR), the individual's sensitivity, and the duration of exposure. While the individual's sensitivity cannot be controlled, and the duration of exposure is a procedural issue, limiting the mismatch between reality and VR can be controlled by measuring and quantifying latency to determine if system response is within a given threshold of performance.

Embodiments of the disclosure include particular methods, apparatuses, and non-transitory computer readable storage media for measuring viewpoint motion latency of a head mounted display. In this regard, such procedures in some embodiments provide a virtualized simulation environment that includes specially configured elements utilized to perform such measuring. The specially configured elements may be updated as described herein as one or more inputs are received, where the specially configured elements enable such measuring.

Example embodiments based on measuring viewpoint latency in a simulation involving an HMD are described, for example as part of measuring and/or testing the validity of a flight simulation system. Additionally and/or alternatively, example embodiments, based on measuring and quantifying the signal time delay between movement of a head mounted display and corresponding movement of the virtual viewpoint within a virtual scene, testing may be performed that distinguishes whether such data indicates that a test of the delay passes or fails.

FIG. 1 illustrates a block diagram for an example system in accordance with at least one aspect of the disclosure. Specifically, FIG. 1 illustrates an example system 100. The example system 100 includes a simulation apparatus 150, at least one display (e.g., display 114 and display 116), a simulation host system 104, and an image generation system 102. In some embodiments, the system 100 optionally includes one or more external sensors 112.

The simulation apparatus 150 includes any number of components, including any number of devices, sub-systems, or other hardware and/or software, that enables simulation of a particular environment, for example an environment for operating a particular vehicle. In some embodiments, the simulation apparatus 150 includes an operator system 110, a head mounted display 106, and a motion system 108. The head mounted display 106 in some embodiments is mounted on or otherwise secured to a test stand, such that a manipulation to the test stand manipulates a position and/or orientation of the head mounted display 106. In some embodiments, the head mounted display 106 is mounted to or otherwise secured to a user in the simulation apparatus 150, for example that is operating certain controls thereof as part of simulating operation of a vehicle via the simulation environment.

The head mounted display 106 includes a display and one or more input and/or output elements. For example, in some embodiments, the head mounted display 106 includes a virtual reality headset. The head mounted display 106 may include one or more displays that depict a virtual viewpoint, or multiple virtual viewpoints, of a virtual environment. The head mounted display 106 additionally may include one or more sensors that determine and/or record a headset orientation, position, movement, and/or the like. In some embodiments, the head mounted display 106 is worn by a user, for example an operator associated with the simulation apparatus 150. Additionally or alternatively, in some embodiments, the head mounted display 106 is secured to a test stand that functions to replace a user head in the simulation apparatus 150. The test stand may be configured to enable movement along a particular test axis, for example such that the head mounted display 106 is similarly moved in accordance with the movement along the test axis. In some embodiments, the head mounted display 106 includes the Varjo™ XR-4 series headset.

The operator system 110 is configured to provide input in accordance with a particular environment to be simulated. For example, in some embodiments, the operator system 110 includes control inputs that mirror those of a particular vehicle for which simulated operation is to be performed. In one example context, the operator system 110 includes cockpit controls of an aerial vehicle for which simulated operation is to be performed. Such inputs may correspond to data values that represent updates to such controls, including any number of analog and/or digital inputs, as a user interacts with such controls.

The motion system 108 simulates movement, vibrations, and/or other motion associated with an environment. In one example context, the motion system 108 simulates motion effects associated with operation of an aerial vehicle, for example based on inputs and/or determined simulation states associated with such a system of the aerial vehicle operating. In some embodiments, the motion system 108 comprises a base system upon which one or more other components of the simulation apparatus 150 are mounted for simulating such motion effects. For example, in some embodiments, the operator system 110 and/or the head mounted display 106 are mounted on, secured to, or otherwise positioned on the motion system 108. In this regard, motion effects initiated by the motion system 108 affect the position and/or orientation of such other components. In some embodiments, the motion system 108 includes a CKAS W10 6-degree of freedom (DOF) motion system.

The system 100 further includes a simulation host system 104. The simulation host system includes hardware, software, firmware, and/or any combination thereof, that generates, maintains, and/or configures a simulation environment. For example, in some embodiments, the simulation host system 104 includes a specially configured server, where the server includes at least software executed on specially configured hardware that maintains the simulation environment. For example, the simulation host system 104 may include at least one processor (e.g., a CPU, multiple CPUs, and/or the like), and at least one non-transitory computer-readable storage medium (e.g., a memory), and is configured to execute the simulation environment upon execution of computer program instructions stored on the at least one non-transitory computer-readable storage medium by the at least one processor.

In some embodiments, the simulation host system 104 maintains one or more simulation environments based on generated and/or received data associated with at least one element of the simulation environment. For example, in some embodiments, the simulation host system 104 receives input data from the operator system 110, motion system 108, and/or head mounted display 106. The operator system 110 may provide input associated with user (e.g., an operator) interactions with controls of the operator system 110, the head mounted display 106 may provide orientation and/or position data based on movement of the head mounted display 106, and/or the motion system 108 may provide movement data indicating changes to orientation, position, vibrations, and/or other movements, for example where such movements affect the other components of the simulation apparatus 150. Such data may be provided directly to the simulation host system 104, or in other embodiments is provided via one or more intermediary devices. In some embodiments, the simulation host system 104 is specially configured to include an instance of Unreal Engine's™ TRU simulation environment.

In some embodiments, the system 100 includes one or more external sensors 112. The external sensors may detect and/or measure one or more aspects associated with the simulation apparatus 150, and/or a portion thereof, for use in configuring the virtual environment and/or a virtual viewpoint of the virtual environment. In some embodiments, the external sensors 112 include movement sensors, cameras, and/or the like. In some embodiments, the external sensors 112 are used to detect particular elements in or associated with the simulation apparatus 150, for example positions of a hand of an operator interacting with the simulation apparatus 150. Additionally or alternatively, in some embodiments, the external sensors 112 measure data values associated with the environment of or around the simulation apparatus 150.

In some embodiments, the system 100 includes an image generation system 102. The image generation system 102 includes hardware, software, firmware, and/or any combination thereof, that generates and/or provides output data for rendering to one or more displays. The output data includes renderings of a virtual viewpoint within a virtual environment, for example as simulated by the simulation host system 104. In some embodiments, the image generation system 102 and the simulation host system 104 share one or more hardware and/or software components, for example where the simulation host system 104 and the image generation system 102 are executed on the same server, and/or where the simulation host system 104 and the image generation system 102 are embodied by submodules of a particular simulation software package. In one example embodiment, the image generation system 102 comprises a single image generation channel, for example of an instance of Unreal Engine's™ TRU simulation environment. In some embodiments, the external sensors 112 may provide measured data to the image generation system 102 and/or the simulation host system 104 for processing as part of configuring one or more virtual elements in a virtual environment.

The image generation system 102 is configured to render particular shapes and other virtual elements of the virtual environment generated, maintained, and/or otherwise configured by the simulation host system 104. In some embodiments, the image generation system 102 provides output data for rendering to one or more displays of the display 114 (e.g., a repeater display), display 116 (e.g., an instructor display), and/or a display of the head mounted display 106. In this regard, the image generation system 102 may continuously cause outputting and/or cause rendering of frames depicting a virtual viewpoint of the virtual environment as updated inputs affecting the virtual environment are received, for example changes in orientation and/or position of the head mounted display 106, control input changes via the operator system 110, and/or motion cueing data from the motion system 108 of the simulation apparatus 150.

In some embodiments, the image generation system 102 includes a specially configured server, where the server includes at least software executed on specially configured hardware that configures renderings of a virtual viewpoint for a virtual environment, for example maintained by the simulation host system 104. The image generation system 102 may include at least one processor (e.g., a CPU, multiple CPUs, and/or the like), and at least one non-transitory computer-readable storage medium (e.g., a memory), and is configured to cause the renderings upon execution of computer program instructions stored on the at least one non-transitory computer-readable storage medium by the at least one processor.

In some embodiments, the system 100 includes any number of displays, each configured to render data viewable by one or more viewers. As illustrated, the head mounted display 106 includes at least one display that provides renderings of a virtual environment. For example, in some embodiments the head mounted display 106 embodies a headset including one or more display that are configured to provide viewing of a three-dimensional virtual environment while wearing the head mounted display 106. Additionally or alternatively, as illustrated, the system 100 includes a display 114 that functions as a repeater display. In this regard, the display 114 may render the same data as outputted to the head mounted display 106, such that the corresponding renderings may be viewed external from the head mounted display 106 by one or more users. Additionally or alternatively, as illustrated, the system 100 further includes a display 116 that functions as an instructor display. The instructor display in some embodiments includes a second repeat display that renders the same data as outputted to the head mounted display 106. In some embodiments the display 116 includes one or more additional and/or alternative renderings that are specific to that display, for example additional UI elements, controls, and/or the like that are specific to operations performed by another user associated with the simulation (e.g., instructor-specific operations). In this regard, the image generation system 102 may provide data representing a virtual viewpoint of a simulation environment for rendering to any one or more of such displays associated therewith.

Figure 2:
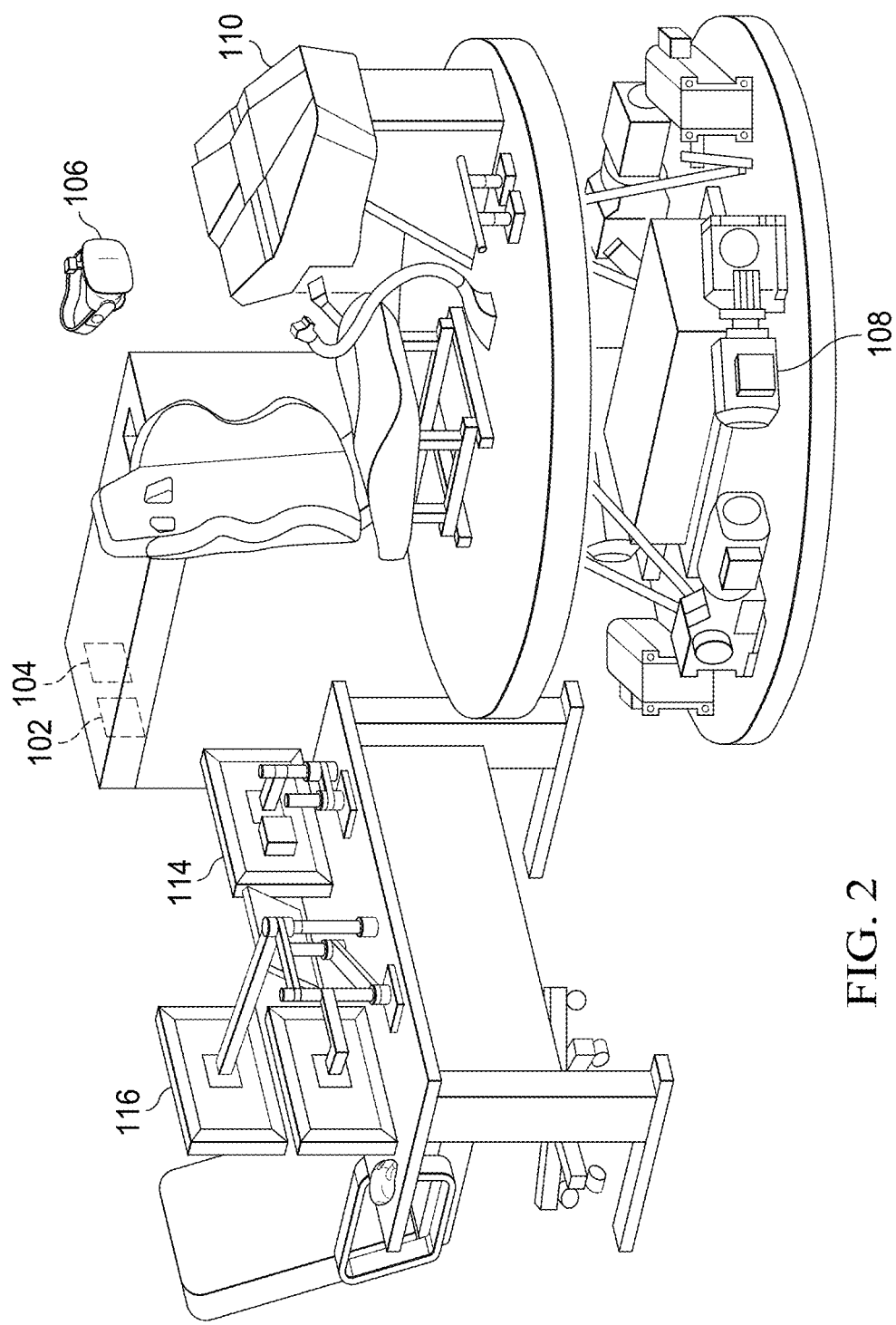
FIG. 2 illustrates a depiction of devices positioned for an example system in accordance with at least one aspect of the disclosure.

FIG. 2 illustrates a depiction of devices positioned for an example system in accordance with at least one aspect of the disclosure. As depicted, the operator system 110 includes any number of subcomponents, for example in some embodiments the operator system 110 includes one or more cockpit controls, one or more primary controls, and/or one or more input/output (I/O) components. The operator system 110 includes a seat or other control where an operator may be located (e.g., seated) during operation of the operator system and/or the simulation apparatus 150 associated therewith.

Further as depicted, the operator system 110 and the head mounted display 106 may be positioned such that they are secured to, or otherwise positioned on top of, the motion system 108. In this regard, each movement and/or motion performed via the motion system 108 may impact such other devices positioned on the motion system 108. The display 116, display 114, image generation system 102, and simulation host system 104 are positioned separately from the motion system 108, such that movements of the motion system 108 do not impact such other devices. The various components may be communicatively coupled via wired and/or wireless means to perform the data transmissions described herein.

Figure 3A:
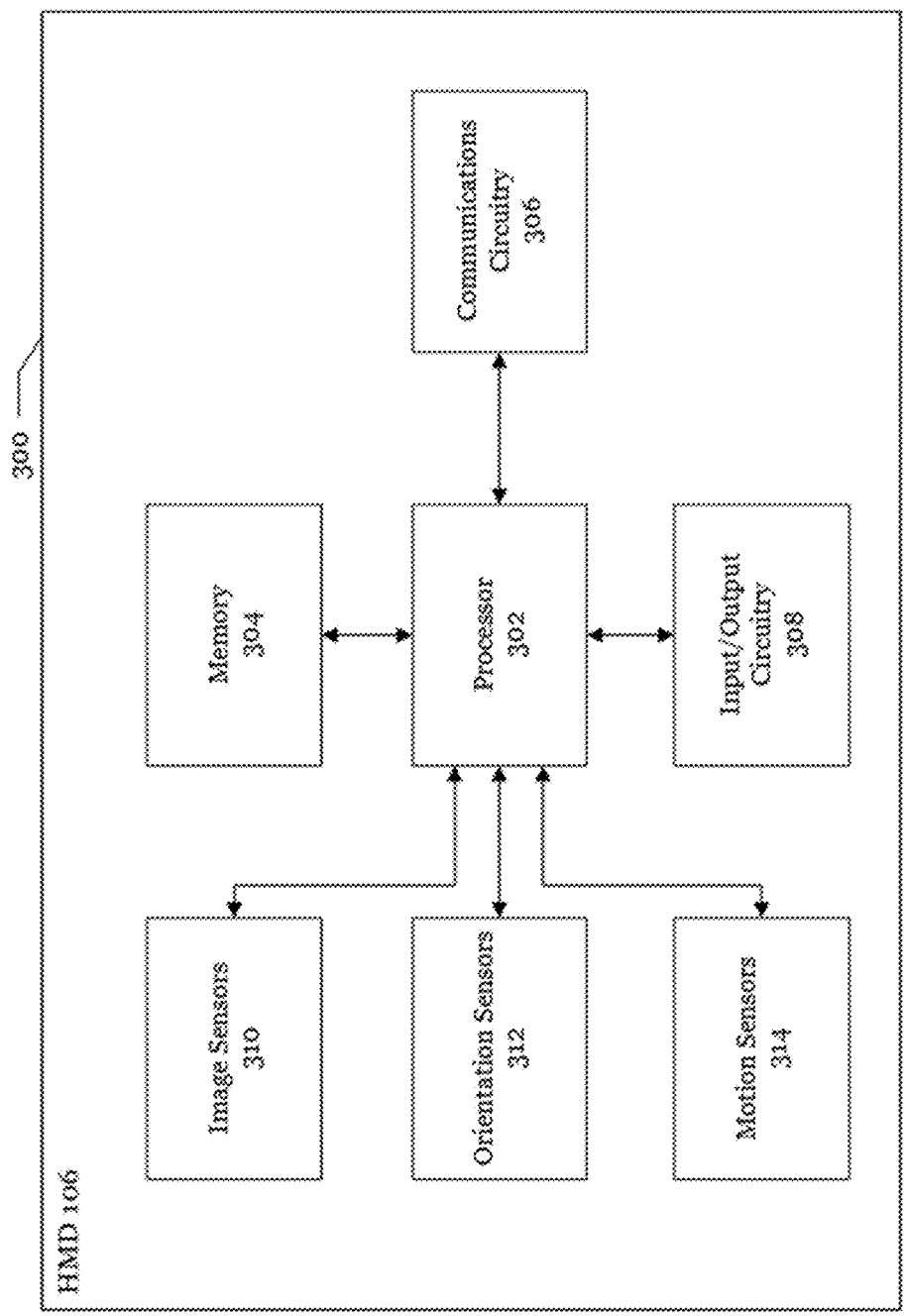
FIG. 3A illustrates a block diagram of an example HMD in accordance with at least one aspect of the disclosure.

FIG. 3A illustrates a block diagram of an example HMD in accordance with at least one aspect of the disclosure. Specifically, FIG. 3A depicts an example apparatus 300 embodying an example of the HMD 106. The apparatus 300 includes a processor 302, a memory 304, a communications circuitry 306, an input/output circuitry 308, one or more image sensors 310, one or more orientation sensors 312, one or more motion sensors 314, and/or one or more combination orientation and motion sensors. The apparatus 300 may be configured, using one or more of the circuitry depicted, to execute the operations described herein.

An apparatus 300 may include one or more processors 302 and one or more computer readable medium (such as memory 304) storing computer code thereon. References to computer-readable storage medium, computer program product, tangibly embodied computer program, or the like, or a controller, monitor, engine monitor, monitoring system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

The apparatus 300 may have at least one processor 302 and at least one memory 304, such as a non-transitory computer readable medium, and may include computer program code, that is configured to, with the at least one processor, perform the method described herein. The memory 304 may be a single component or it may be implemented as one or more separate components some or all of which may be integrated or removable and may provide permanent, semi-permanent, dynamic, or cached storage.

The one or more processors 302 are configured to read from and write to the at least one memory 304. The processor may also comprise a bus or an output interface via which data or commands are output by the processor 302 and an input interface via which data or commands are input to the processor 302. The memory 304 stores a computer program including computer program instructions that control the operation of apparatus 300, when loaded into the processor. The computer program instructions provide the logic and routines that enable the apparatus to perform the engine monitoring methods and implement the engine monitoring systems. The processor 302, by reading the memory 304, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

Although the components are described with respect to functional limitations, it should be understood that the particular implementations necessarily include the use of particular hardware. It should also be understood that certain components described herein may include similar or common hardware. For example, two sets of circuitry and/or modules may both leverage use of the same processor, network interface, storage medium, or the like to perform their associated functions, such that duplicate hardware is not required for each set of circuitry. The use of the term "module" and/or the term "circuitry" as used herein with respect to components of the apparatus 300 should therefore be understood to include particular hardware configured to perform the functions associated with the particular sets of circuitries as described herein.

Additionally or alternatively, the terms "circuitry" and "module" should be understood broadly to include hardware and, in some embodiments, software and/or firmware for configuring the hardware. For example, in some embodiments "circuitry" and "module" may include processing circuitry, non-transitory storage media, network interfaces, input/output devices, and/or the like. In some embodiments, other elements of the apparatus 300 may provide or supplement the functionality of the particular set of circuitries. The processor 302 may provide processing functionality, the memory 304 may provide processing functionality, the memory 304 may provide storage functionality, the communications circuitry 306 may provide network interface functionality, and the like.

In some embodiments, the processor 302 (and/or processor or any other processing circuitry assisting or otherwise associated with the processor) may be in communication with the memory 304 via a bus for passing information among components of the apparatus 300. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus 300 to carry out various functions in accordance with example embodiments of the present disclosure.

The processor 302 may be embodied in any one or more of a myriad of ways and may, for example, include one or more processing devices configured to perform independently. Additionally or alternatively, the processor 302 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, field-programmable gate array (FPGA), graphic processing unit (GPU), application specific integrated circuit (ASIC), and/or remote and/or cloud processors.

In an example embodiment, the processor 302 may be configured to execute computer-coded instructions stored in the memory 304 or otherwise accessible to the processor. Alternatively, or additionally, the processor 302 may be configured to execute hard-coded functionality. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor is embodied as an executor of software instructions, the instructions may specially configure the processor to perform the algorithms and/or operations described herein when the instructions are executed.

In one example context, the system 100, in conjunction with apparatus 300, may be configured to record, measure, and/or provide data associated with the orientation, position, movement, and/or elements associated with interacting with the HMD. Additionally or alternatively, in some embodiments, the system 100 may be configured to generate (for example, by rendering) a virtual environment using apparatus 300. The system 100 generates the virtual environment including at least a first shape and a second shape in a virtual viewpoint of the virtual environment. The system 100 generates the first shape and second shape in affixed in the virtual environment. The virtual viewpoint of the virtual environment is configured to shift in response to movement of a head mounted display secured to a test stand and may result in "seeing" more or less of each of the first shape and/or the second shape. The system 100 may be configured to update the generated virtual viewpoint of the virtual environment in response to positioning information corresponding to a movement of the test stand to an excursion value along a test axis, and a movement from the excursion value to a neutral value along the test axis. The system 100 is further configured to provide HMD spatial position data associated with the apparatus 300 secured to the test stand, for example as it moves along the test axis. In some embodiments, the system 100 is configured to continuously generate the virtual environment, for example to a display, as updated data associated with the virtual environment is received.

In some embodiments, the apparatus 300 may include input/output circuitry 308 that may, in turn, be in communication with processor 302 to provide output to the user and in some embodiments, to receive an indication of one or more user inputs. The input/output circuitry 308 may comprise a user interface and may include a display (e.g., for rendering one or more user interfaces, such as to the display). The user interfaces comprise a web user interface, customized device application, native device interface, a mobile and/or desktop application, or in some embodiments includes a client device linked or otherwise networked to an associated system configuring the virtual environment. In some embodiments, the input/output circuitry 308 may also include gesture controls, soft keys, buttons, a microphone, a speaker, touch areas, and/or other input/output mechanisms. The processor, such as the processor 302, and/or the user interface circuitry comprising the processor, for example, processor 302 may be configured to control one or more functions of one or more user interface elements through computer program instructions (e.g., software and/or firmware) stored on a memory accessible to the processor 302 (e.g., via memory 304, and/or the like).

The communications circuitry 306 may be any means, including for example and without limitation a device or circuitry embodied in hardware, software, firmware, and/or any combination thereof, which is configured to receive and/or transmit data from and/or to a network and/or any other device, circuitry, or module in communication with the apparatus 300. In this regard, the communications circuitry 306 may include, for example, a network interface for enabling communications with a wired or wireless communications network. For example, the communications circuitry 306 may include one or more network interface cards, antennas, buses, switches, routers, modems, and supporting hardware and/or software, or any other device suitable for enabling communications via a network. Additionally or alternatively, in some embodiments the communication interface may include the circuitry for interacting with the antennas to cause transmission of signals via the antennas or to adjust receipt of signals received via the antennas.

The apparatus 300 in some embodiments further includes one or more image sensors 310. In some embodiments, the image sensors 310 include one or more cameras that capture images, videos, and/or the like surrounding the head mounted display. For example, in some embodiments, the image sensors 310 includes cameras that face outward from the apparatus 300, for example to the sides, above, below, and/or forward from an axis relatively normal to a wearer's eyes. In some embodiments, the image sensors 310 includes cameras that face inward from the apparatus 300, for example towards the eyes of a wearer. The image sensors 310 may be processed to detect objects in the environment of the apparatus 300 (e.g., hands, eyes, operator controls, and the like) that are associated with interacting with a virtual environment and/or depicting virtual elements in the virtual environment.

The apparatus 300 in some embodiments further includes one or more orientation sensors 312. In some embodiments, the orientation sensors 312 include one or more devices that are specially configured to measure orientation and/or position data associated with the apparatus 300. In some embodiments, the orientation sensors 312 includes at least one gyroscope, accelerometer, magnetometer, LiDAR sensor, and inertial measurement unit (IMU), and/or the like. In some embodiments, the one or more orientation sensors 312 includes one or more image sensors, for example of the image sensors 310, where orientation and/or position is determined from captured image data. The orientation sensors may detect and/or measure changes in rotation and/or position of the apparatus 300. For example, the orientation sensors 312 may measure data indicating the orientation and/or position of the apparatus 300 as the head mounted display is repositioned via a test stand.

The apparatus 300 in some embodiments further includes one or more motion sensors 314. In some embodiments, the motion sensors 314 include a vibration motion sensor, a passive infrared sensor, a hybrid type sensor, and/or the like that detects movement and/or reorientation of the apparatus 300. In some embodiments, the motion sensors 314 include one or more of the orientation sensors 312. In some other embodiments, the motion sensors 314 include one or more of the image sensors 310, for example where motion is detected from captured image data.

In some embodiments, one or more of the circuitries of apparatus 300 is combined into a single module configured to perform some, or all, of the actions described with respect to the individual circuitry. For example, in some embodiments, the processor 302 is combined with one or more of the other circuitry components of the apparatus 300.

Figure 3B:
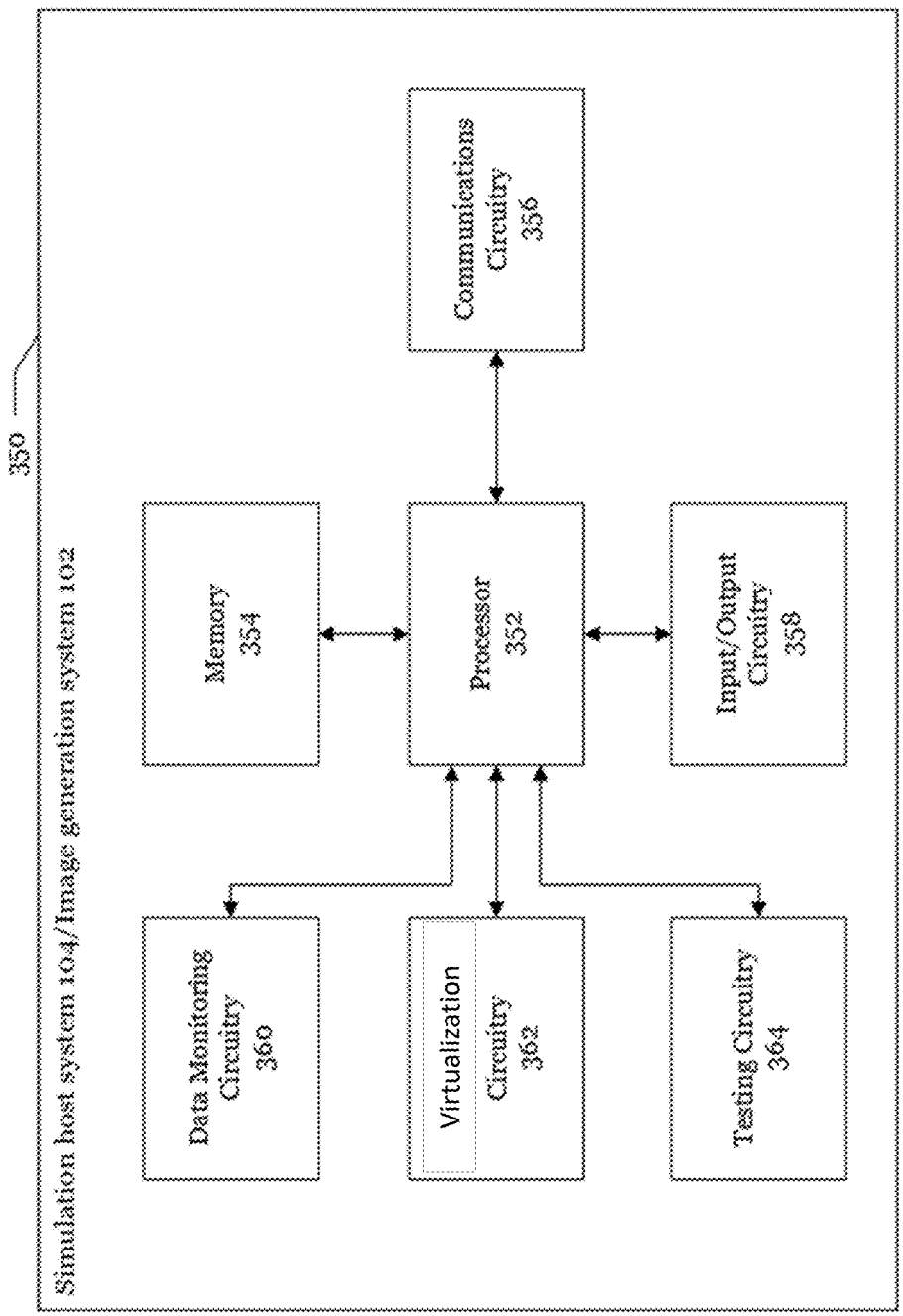
FIG. 3B illustrates a block diagram of an example apparatus in accordance with at least one aspect of the disclosure.

FIG. 3B illustrates a block diagram of an example apparatus in accordance with at least one aspect of the disclosure. Specifically, FIG. 3B depicts an example apparatus 350 embodying an example implementation of the simulation host system 104 and/or image generation system 102. The apparatus 350 includes a processor 352, a memory 354, a communications circuitry 356, an input/output circuitry 358, data monitoring circuitry 360, virtualization circuitry 362, and testing circuitry 364. The apparatus 350 may be configured, using one or more of the circuitry depicted, to execute the operations described herein.

An apparatus 350 may include one or more processors 352 and one or more computer readable medium (such as memory 354) storing computer code thereon. References to computer-readable storage medium, computer program product, tangibly embodied computer program, or the like, or a controller, monitor, engine monitor, monitoring system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

The apparatus 350 may have at least one processor 352 and at least one memory 354, such as a non-transitory computer readable medium, and may include computer program code, that is configured to, with the at least one processor, perform the method described herein. The memory 354 may be a single component or it may be implemented as one or more separate components some or all of which may be integrated or removable and may provide permanent, semi-permanent, dynamic, or cached storage.

The one or more processors 352 are configured to read from and write to the at least one memory 354. The processor may also comprise a bus or an output interface via which data or commands are output by the processor 352 and an input interface via which data or commands are input to the processor 352. The memory 354 stores a computer program including computer program instructions that control the operation of apparatus 350, when loaded into the processor. The computer program instructions provide the logic and routines that enable the apparatus to perform the engine monitoring methods and implement the engine monitoring systems. The processor 352, by reading the memory 354, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

Although the components are described with respect to functional limitations, it should be understood that the particular implementations necessarily include the use of particular hardware. It should also be understood that certain components described herein may include similar or common hardware. For example, two sets of circuitry and/or modules may both leverage use of the same processor, network interface, storage medium, or the like to perform their associated functions, such that duplicate hardware is not required for each set of circuitry. The use of the term "module" and/or the term "circuitry" as used herein with respect to components of the apparatus 350 should therefore be understood to include particular hardware configured to perform the functions associated with the particular sets of circuitries as described herein.

Additionally or alternatively, the terms "circuitry" and "module" should be understood broadly to include hardware and, in some embodiments, software and/or firmware for configuring the hardware. For example, in some embodiments "circuitry" and "module" may include processing circuitry, non-transitory storage media, network interfaces, input/output devices, and/or the like. In some embodiments, other elements of the apparatus 300 may provide or supplement the functionality of the particular set of circuitry. The processor 352 may provide processing functionality, the memory 354 may provide processing functionality, the memory 354 may provide storage functionality, the communications circuitry 356 may provide network interface functionality, and the like.

In some embodiments, the processor 352 (and/or processor or any other processing circuitry assisting or otherwise associated with the processor) may be in communication with the memory 354 via a bus for passing information among components of the apparatus 350. The memory 304 may be non-transitory and may include, for example, one or more volatile and/or non-volatile memories. In other words, for example, the memory may be an electronic storage device (e.g., a computer readable storage medium). The memory 354 may be configured to store information, data, content, applications, instructions, or the like, for enabling the apparatus 350 to carry out various functions in accordance with example embodiments of the present disclosure.

The processor 352 may be embodied in any one or more of a myriad of ways and may, for example, include one or more processing devices configured to perform independently. Additionally or alternatively, the processor 352 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, field-programmable gate array(s) (FPGA(s)), graphic processing unit(s) (GPU(s)), application specific integrated circuit(s) (ASIC(s)), and/or remote and/or "cloud" processors.

In an example embodiment, the processor 352 may be configured to execute computer-coded instructions stored in the memory 354 or otherwise accessible to the processor. Alternatively, or additionally, the processor 352 may be configured to execute hard-coded functionality. As such, whether configured by hardware or software methods, or by a combination thereof, the processor 352 may represent an entity (e.g., physically embodied in circuitry) capable of performing operations according to an embodiment of the present disclosure while configured accordingly. Alternatively, as another example, when the processor is embodied as an executor of software instructions, the instructions may specially configure the processor to perform the algorithms and/or operations described herein when the instructions are executed.

As one example context, the processor 352 may be configured to generate a virtual environment and/or a particular virtual viewpoint thereof. Additionally or alternatively, in some embodiments, the processor 352 may be configured to request and/or receive data from one or more other devices, for example positioning information from a motion cueing system and/or HMD spatial position data from an HMD. Additionally or alternatively, in some embodiments, the processor 352 may be configured to generate virtual adjustment information. Additionally or alternatively, in some embodiments, the processor 352 may be configured to record reference data of at least one shape in a virtual viewpoint of a virtual environment. Additionally or alternatively, in some embodiments, the processor 352 may be configured to generate at least one positional displacement vector and/or at least one orientation displacement angle. Additionally or alternatively, in some embodiments, the processor 352 may be configured to detect a test completion trigger. Additionally or alternatively, in some embodiments, the processor 352 may be configured to determine at least one error based on the at least one positional displacement vector and/or at least one orientation displacement angle. Additionally or alternatively, in some embodiments, the processor 352 may be configured to determine a test result based on one or more errors. Additionally or alternatively, in some embodiments, the processor 352 may be configured to output a test result to one or more displays.

In some embodiments, the apparatus 350 may include input/output circuitry 358 that may, in turn, be in communication with processor 352 to provide output to the user and in some embodiments, to receive an indication of one or more user inputs. The input/output circuitry 358 may comprise a user interface and may include a display (e.g., for rendering one or more user interfaces, such as to the display). The user interfaces comprise a web user interface, customized device application, native device interface, a mobile and/or desktop application, or in some embodiments includes a client device linked or otherwise networked to an associated system configuring the virtual environment. In some embodiments, the input/output circuitry 358 may also include gesture controls, soft keys, buttons, a microphone, a speaker, touch areas, and/or other input/output mechanisms. The processor, such as the processor 352, and/or the user interface circuitry comprising the processor, for example processor 352, may be configured to control one or more functions of one or more user interface elements through computer program instructions (e.g., software and/or firmware) stored on a memory accessible to the processor 352 (e.g., via memory 354, and/or the like).

The communications circuitry 356 may be any means, including for example and without limitation a device or circuitry embodied in hardware, software, firmware, and/or any combination thereof, which is configured to receive and/or transmit data from and/or to a network and/or any other device, circuitry, or module in communication with the apparatus 350. In this regard, the communications circuitry 356 may include, for example, a network interface for enabling communications with a wired or wireless communications network. For example, the communications circuitry 356 may include one or more network interface cards, antennas, buses, switches, routers, modems, and supporting hardware and/or software, or any other device suitable for enabling communications via a network. Additionally or alternatively, in some embodiments the communication interface may include the circuitry for interacting with the antennas to cause transmission of signals via the antennas or to adjust receipt of signals received via the antennas.

The apparatus 350 in some embodiments further includes the data monitoring circuitry 360. In some embodiments, the data monitoring circuitry 360 is configured to communicate with one or more devices to receive data for processing. For example, in some embodiments, the data monitoring circuitry 360 is configured to receive positioning information from a motion cueing system, where the positioning information includes one or more portions associated with one or more times. Additionally or alternatively, in some embodiments, the data monitoring circuitry 360 is configured to receive HMD spatial position data associated with an HMD from the HMD and/or one or more sensors thereof. The data monitoring circuitry 360 may continuously communicate with one or more of such devices.

The apparatus 350 in some embodiments further includes virtualization circuitry 362. In some embodiments, the virtualization circuitry 362 is configured to generate and/or configure a virtual environment, and/or one or more virtual elements therein. For example, in some embodiments the virtualization circuitry 362 generates a virtual environment that includes at least a first shape and a second shape. In some embodiments, the virtualization circuitry 362 configures at least a first shape and a second shape for depicting within a virtual viewpoint of the virtual environment. Additionally or alternatively, in some embodiments, the virtualization circuitry 362 is configured to generate virtual adjustment information, and/or apply the virtual adjustment information to a virtual viewpoint of a virtual environment for outputting.

The apparatus 350 in some embodiments further includes testing circuitry 364 and/or software. In some embodiments, the testing circuitry 364 and/or software is configured to detect a test completion trigger that indicates a request to generate a test result for a testing procedure. In some embodiments, the testing circuitry 364 and/or software records reference data associated with one or more shapes. In some embodiments, the testing circuitry 364 and/or software generates at least one positional displacement vector and/or at least one orientation displacement angle. In some embodiments, the testing circuitry 364 and or software determines at least one error based on at least one positional displacement vector and/or at least one orientation displacement. In some embodiments, the testing circuitry 364 determines a test result based on at least one error, for example an HMD orientation tracking error and/or an HMD movement tracking error.

In some embodiments, one or more of the circuitries of apparatus 350 is combined into a single module configured to perform some, or all, of the actions described with respect to the individual circuitry. For example, in some embodiments, the processor 352 is combined with one or more of the other circuitry components of the apparatus 350. In some embodiments "circuitry" may be embodied in software, or the like.

Example virtual elements of virtual environments simulated in accordance with embodiments of the present disclosure are further provided. In some embodiments, the virtual elements as depicted and discussed are generated and/or maintained by one or more systems and/or devices of the system 100. For example, in some embodiments, the simulation host system 104 and/or the image generation system 102 are configured to generate, render, and/or otherwise process data associated with the virtual elements as depicted and described herein. The virtual elements may be used in one or more processes for measuring viewpoint compensation, testing viewpoint compensation, and/or the like as described herein.

Figure 4B:
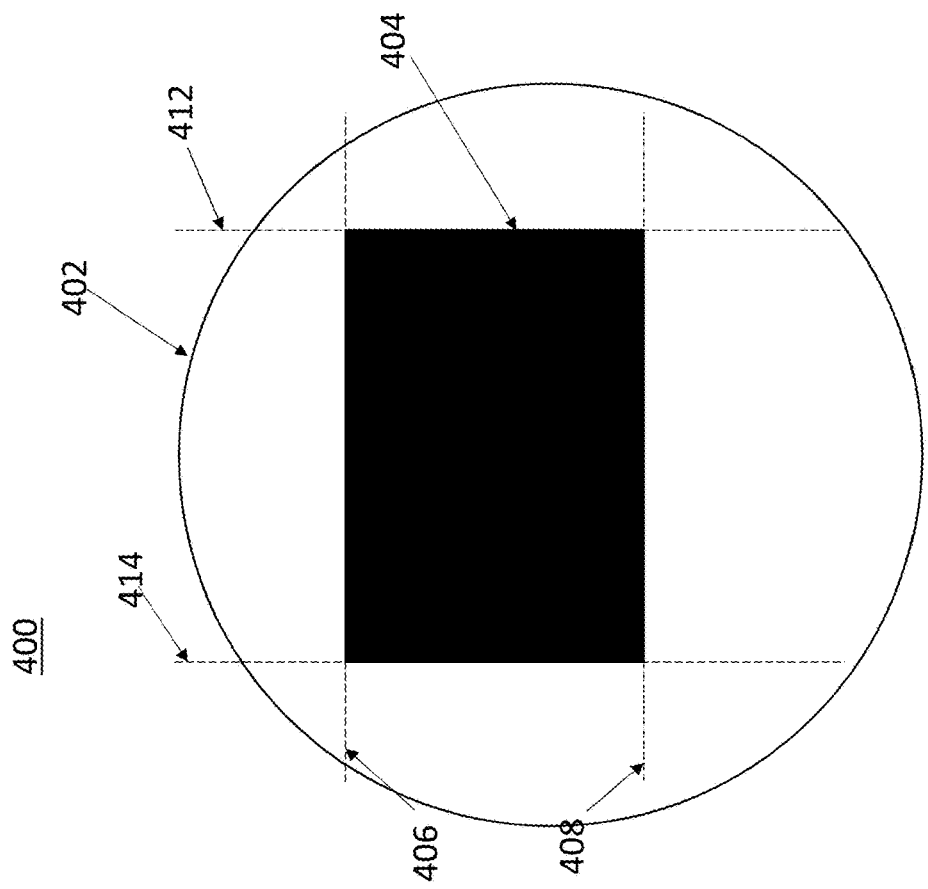
FIGS. 4A, 4B, 5A, and 5B illustrates virtual environments in accordance with at least one aspect of the disclosure.
Figure 4A:
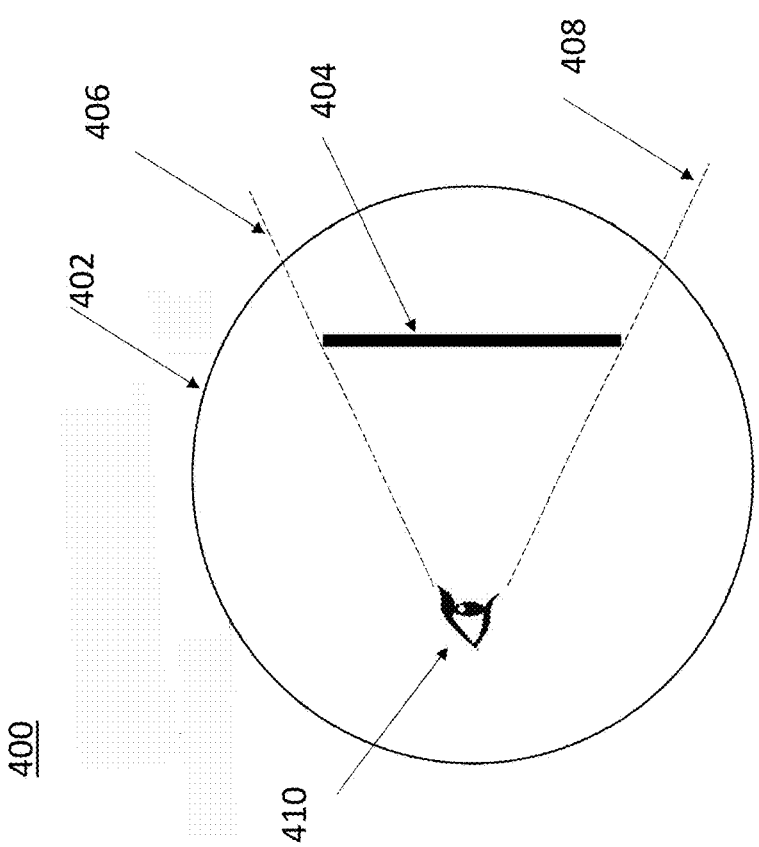

FIGS. 4A, 4B, 5A, and 5B illustrate a depiction of example shapes in accordance with at least one aspect of the disclosure. Specifically, FIG. 4A depicts a first shape 402 and a second shape 404 from a first inward looking view of the virtual environment 400 to the side of a virtual viewpoint 410. FIG. 4B depicts the first shape 402 and the second shape 404 from a second inward looking view of the virtual environment 400 from behind a user's perspective (not shown here). The first shape 402 and the second shape 404 embody virtual elements that are renderable within a virtual environment. In essence, the second shape is suspended in front of a portion of the first shape. Accordingly, a portion the HMD display(s) may show the color of the second shape when the virtual viewpoint is directed towards a field of view comprising the second shape. The remainder of the HMD display(s) will be the color of the first shape, or all in the case where the virtual viewpoint 410 is not directed towards the second shape at all.

As illustrated, the first shape 402 includes a spherical shape form that surrounds the virtual viewpoint 410 in the virtual environment 400. The inner surface of the first shape 402 may be white in some embodiments. In some embodiments, the inner surface of the first shape 402 may be a color having a luminance greater than a first threshold when rendered on the HMD viewing screen.

The second shape 404 is a shape that will precisely fill the virtual field of view when the HMD is stationary (i.e., affixed to the test stand) inside the bounds of the first shape 402. For example, as illustrated the second shape 404 is a flat two-dimensional (2D) wall that extends from a top edge of the virtual point of view 406 to a bottom of the virtual point of view 408, and is located between the virtual viewpoint 410 and the first shape 402 in the virtual environment 400. As shown in FIG. 4B, the second shape also extends from the right edge of the virtual point of view 412 to the left edge of the virtual point of view 414. Additionally or alternatively, in some embodiments the second shape may be rendered as a curved or three-dimensional (3D).

In some embodiments, the first shape 402 and the second shape 404 are configured such that while the test stand, and accordingly the mounted HMD, are in a first position, second shape 404 only is visible in the HMD, and first shape 402 is completely hidden behind second shape 404 in the virtual environment 400. Accordingly, the HMD screen will be completely the color and associated luminance of the second shape 404. In some embodiments, the HMD screen will be completely black when stationary. In some embodiments, the first shape will have a luminance greater than 30000 candela per square meter ($cd/m^2$) when only the first shape is displayed in the HMD. In some embodiments, the second shape will have a luminance less than 1000 candela per square meter ($cd/m^2$) when only the second shape is displayed in the HMD.

Figure 5B:
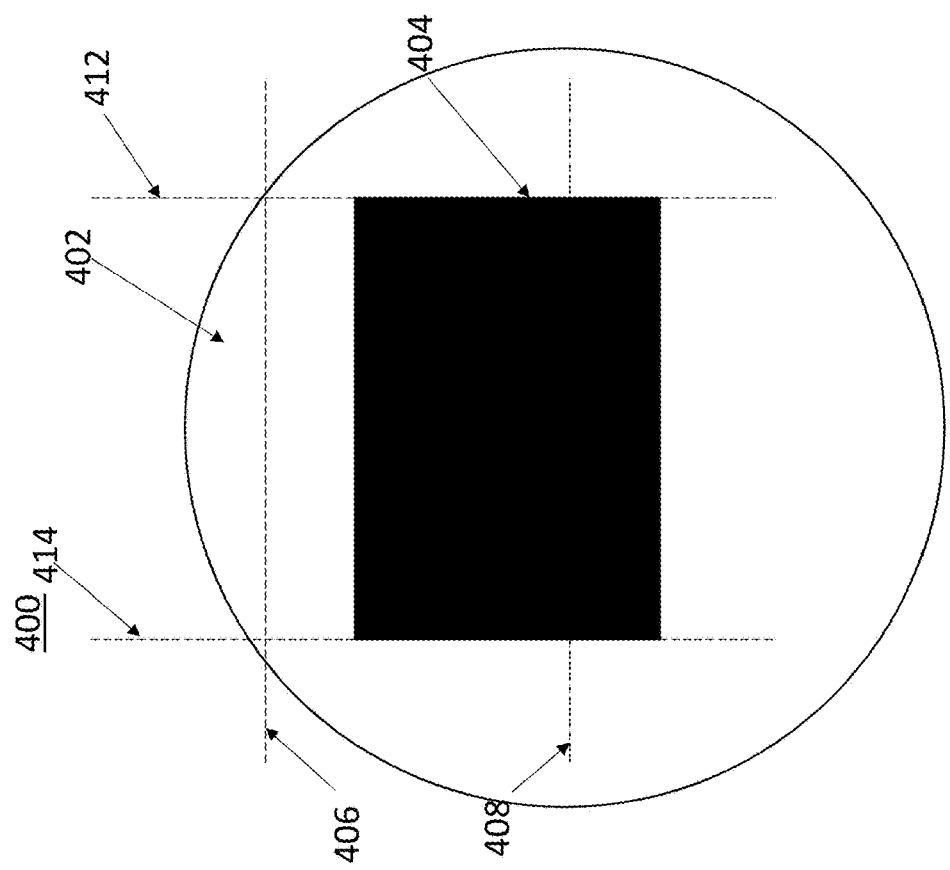
Figure 5A:
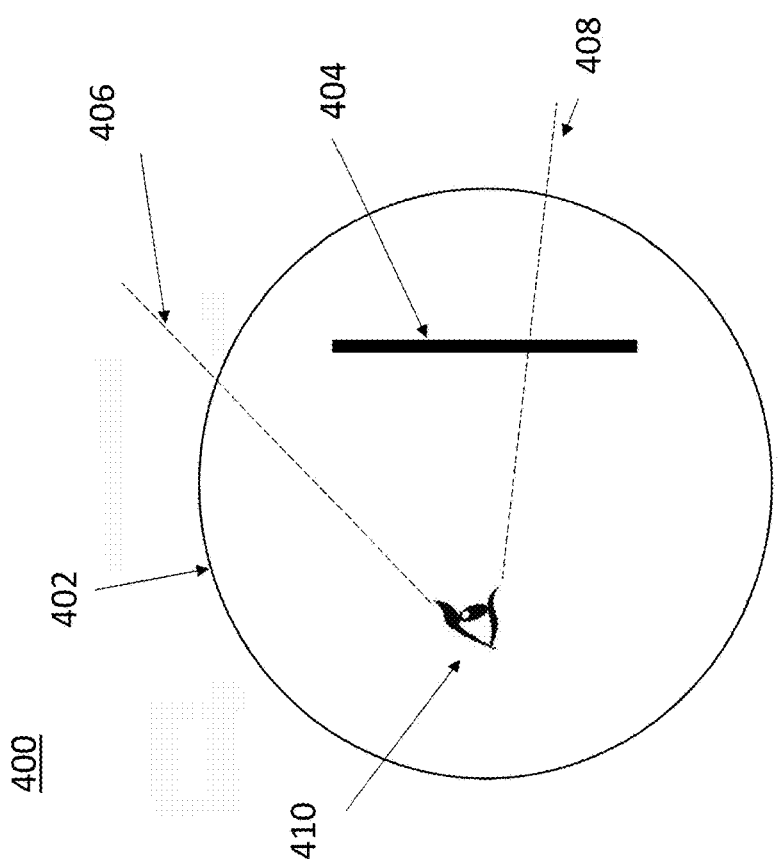

In some embodiments, a virtual viewpoint of a virtual environment is configured to adjust in response to one or more inputs. For example, in some embodiments a virtual viewpoint is updated in response to movements of a HMD, such as via movement and/or rotation along a test axis via a test stand. In one context, if a head mounted display is rotated up, the virtual viewpoint of the virtual environment may similarly be rotated in an upwards direction within the virtual environment as shown in FIGS. 5A and 5B. Accordingly, the HMD can then effectively "look over" the second shape 404 to see portions of the first shape 402. Portions of the HMD display may then be the color of first shape 402, as the field of view now encompasses portions of the first shape, and a luminance change of the HMD display may occur. In some embodiments, the first shape 402 and the second shape 404 are configured to be affixed in the virtual environment 400.

Figure 6:
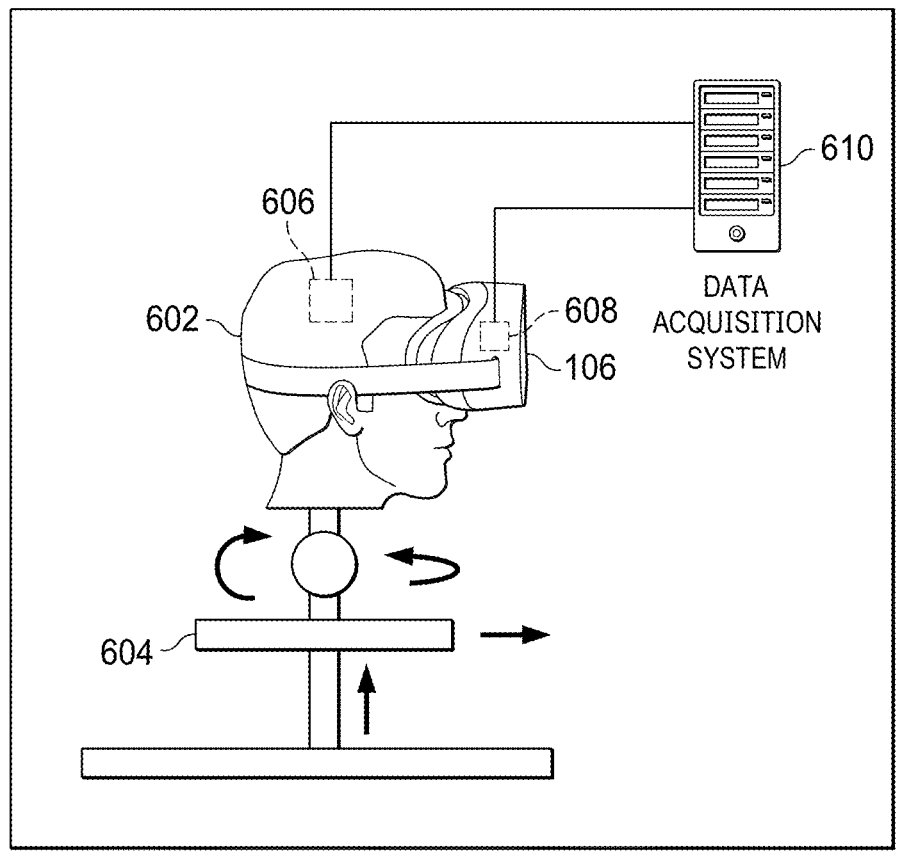
FIG. 6 illustrates a depiction of testing setup in accordance with at least one aspect of the disclosure.

FIG. 6 is a setup for measuring signal time delay between movement of a head mounted display and corresponding movement of the virtual viewpoint within a virtual scene, according to some embodiments. In some embodiments the HMD 106 is mounted on a model head 602 mounted to a test stand 604. The test stand 604 is individually adjustable and lockable in all six degrees of freedom (surge, sway, heave, roll, pitch, yaw). The test stand 604 allows the model head 602 to be rapidly and manually adjusted in any given degree of freedom. A light sensor 608 is imbedded within the model head 602 at a model eye point. An accelerometer 606 is also imbedded within the model head 602. Both the light sensor 608 and accelerometer 606 transmit signals to a high-rate data acquisition system (DAQ) 610. The DAQ 610 is capable of simultaneously recording both signals from the light sensor 608 and accelerometer 606, and generating a data file for analysis.

Light sensor 608 may be a photocell, also known as a photoresistor or light-dependent resistor (LDR), according to some embodiments. A LDR is an electronic component that changes its resistance based on the amount of light it receives. Made from a semiconductor material, typically cadmium sulfide (CdS), the photocell has a resistance that decreases as the intensity of light increases. When exposed to darkness or low light levels, the resistance of the photocell is high, restricting the flow of electrical current. Conversely, in bright light, its resistance drops, allowing more current to pass through. In some embodiments, the light sensor 608 may be a photodiode or phototransistor. Photodiodes and phototransistors are types of photocells that respond to light by generating a small electrical current. Photodiodes and phototransistors are faster and more sensitive than LDRs, making them ideal for high-speed or low-light applications, and may be selected based on the luminance difference expected to be generated by the HMD 106, and the expected delay times being measured.

Accelerometer 606 is a sensor that measures acceleration forces, which can be static, like the constant force of gravity, or dynamic, such as those caused by movement or vibration. Accelerometer 606 detects changes in velocity or direction of the model head 602 on the test stand 604 by sensing the rate of change in speed along one or more axes—typically X, Y, and Z. Accelerometer 606 can generate signaling that can be used to determine orientation, detect motion, or measure the tilt of the model head 602 on the test stand 604. In some embodiments the accelerometer 606 may be a piezoelectric, capacitive, or microelectromechanical systems (MEMS) type accelerometer. In some embodiments the accelerometer 606 is a triaxial accelerometer. DAQ 610 may include a processor, a memory, communications circuitry, and/or input/output (I/O) circuitry.

References to computer-readable storage medium, computer program product, tangibly embodied computer program, or the like, or a controller, monitor, engine monitor, monitoring system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

The DAQ 610 may have at least one processor and at least one memory, such as a non-transitory computer readable medium, and may include computer program code, that is configured to, with the at least one processor, perform the method described herein. The memory may be a single component or it may be implemented as one or more separate components some or all of which may be integrated or removable and may provide permanent, semi-permanent, dynamic, or cached storage.

The one or more processors are configured to read from and write to the at least one memory. The processor may also comprise a bus or an output interface via which data or commands are output by the processor and an input interface via which data or commands are input to the processor. The memory stores a computer program including computer program instructions that control the operation of controller, when loaded into the processor. The computer program instructions provide the logic and routines that enable the apparatus to perform the engine monitoring methods and implement the engine monitoring systems. The processor, by reading the memory, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

Although the components are described with respect to functional limitations, it should be understood that the particular implementations necessarily include the use of particular hardware. It should also be understood that certain components described herein may include similar or common hardware. For example, two sets of circuitry and/or modules may both leverage use of the same processor, network interface, storage medium, or the like to perform their associated functions, such that duplicate hardware is not required for each set of circuitries. The use of the term "module" and/or the term "circuitry" as used herein with respect to components of the DAQ 610 should therefore be understood to include particular hardware configured to perform the functions associated with the particular sets of circuitries as described herein.

Additionally or alternatively, the terms "circuitry" and "module" should be understood broadly to include hardware and, in some embodiments, software and/or firmware for configuring the hardware. For example, in some embodiments "circuitry" and "module" may include processing circuitry, non-transitory storage media, network interfaces, input/output devices, and/or the like. In some embodiments, other elements of the DAQ 610 may provide or supplement the functionality of the particular set of circuitries. The processor may provide processing functionality, the memory may provide storage functionality, the communications circuitry may provide network interface functionality, signaling input/output, and the like.

In some embodiments, the processor (and/or processor or any other processing circuitry assisting or otherwise associated with the processor) may be in communication with the memory via a bus for passing information among components of the DAQ 610. The memory may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the DAQ 610 to carry out various functions in accordance with example embodiments of the present disclosure.

The processor may be embodied in any one or more of a myriad of ways and may, for example, include one or more processing devices configured to perform independently. Additionally or alternatively, the processor may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, field-programmable gate array(s) (FPGA(s)), graphic processing unit(s) (GPU(s)), application specific integrated circuit(s) (ASIC(s)), and/or remote and/or "cloud" processors.

In an example embodiment, the processor may be configured to execute computer-coded instructions stored in the memory or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specially configure the processor to perform the algorithm(s) and/or operations described herein when the instructions are executed.

In some embodiments, the DAQ 610 may be configured to record, measure, and/or provide data associated with light sensor 608 and accelerometer 606. In some embodiments, the DAQ is configured to sample the signal from the light sensor 608 at a first sample rate. In some embodiments, the DAQ is configured to sample the signal from the accelerator at a second sample rate. In some embodiments the first sample rate and the second sample rate frequency are the same. In some embodiments the first sample rate and the second sample rate are between 10 to 100,000 Hz, such as 2000 Hz.

In some embodiments, the DAQ 610 may include an input/output module that may, in turn, be in communication with the processor, light sensor 608, and accelerometer 606 to provide output to a user or secondary system; and in some embodiments, to receive an indication of one or more user input(s). The input/output module may comprise a user interface and may include a display (e.g., for rendering one or more user interfaces, such as to the display) for accessing and viewing the data file generated as a result of testing. The user interfaces comprise a web user interface, customized device application, native device interface, a mobile and/or desktop application, or in some embodiments includes a client device linked or otherwise networked to an associated system configuring the virtual environment. In some embodiments, the input/output module may also include gesture controls, soft keys, buttons, a microphone, a speaker, touch areas, and/or other input/output mechanisms. The processor, such as the processor, and/or the user interface circuitry comprising the processor, for example processor, may be configured to control one or more functions of one or more user interface elements through computer program instructions (e.g., software and/or firmware) stored on a memory accessible to the processor (e.g., via memory, and/or the like).

The communications circuitry may be any means, including for example and without limitation a device or circuitry embodied in hardware, software, firmware, and/or any combination thereof, which is configured to receive and/or transmit data and/or signaling from and/or to a network and/or any other device, circuitry, or module in communication with the DAQ 610. In this regard, the communications circuitry may include, for example, a network interface for enabling communications with a wired or wireless communications network. For example, the communications circuitry may include one or more network interface card(s), antenna(s), buses, switches, routers, modems, and supporting hardware and/or software, or any other device suitable for enabling communications via a network. Additionally or alternatively, in some embodiments the communication interface may include the circuitry for interacting with the antenna(s) to cause transmission of signals via the antenna(s) or to adjust receipt of signals received via the antenna(s).

In some embodiments, one or more of the circuitries of DAQ 610 is combined into a single module configured to perform some, or all, of the actions described with respect to the individual circuitry. For example, in some embodiments, the processor may be combined with one or more of the other circuitry components of the DAQ 610.

As part of the testing, an image of a virtual environment is generated and displayed within the HMD 106. In some embodiments, the virtual environment consists of the first test shape and the second test shape. A first shape may be a white sphere and may be generated and centered on the virtual viewpoint, surrounding the virtual viewpoint. A second shape such as a black, 2D surface may be generated within the sphere, directly in front of the virtual viewpoint. The black surface may be shaped and positioned to exactly fill the virtual field of view. Accordingly, at the beginning of the test, the HMD 106 display may be completely dark (black).

To begin a test capture, a human test operator may move the model head 602 in a direction of the test stand's 604 unlocked degree of freedom. In some embodiments, the movement of the model head 602 may be a rapid change in orientation that results in an initial acceleration yielding an accelerometer 606 signal change greater than a threshold value. In some embodiments, the movement of the model head 602 results in an accelerometer 606 signal indicating an acceleration equal to or greater than 0.25 times the gravitational force (0.25 G). In some embodiments, the movement of the model head 602 results in an accelerometer 606 signal changing greater than an electrical noise level of the accelerometer 606. The accelerometer 606 in the model head 602 will register the movement of the model head 602 on the test stand 604, and sends a corresponding signal to the DAQ 610. In some embodiments the Accelerometer 606 sends a first signal to the DAQ 610 while the model head 602 is at rest in a pre-test position, and then a second different signal to the DAQ 610 based on the acceleration of the model head 602 from the movement. The DAQ 610 will record the change in accelerometer 606 signal and the transition is marked as movement initiation.

Additionally, due to the movement of the HMD 106 attached to the model head 602, one or more HMD 106 tracking sensors also register the model head movement as a change in distance to the HMD 106. The HMD 106 tracking sensors send a signal containing this data to the image generation system 102. HMD 106 and/or system 100 software then converts the data into a new real-world spatial position of the HMD 106 and sends that information to the virtual environment generating software. The virtual environment generating software adjusts the spatial position of the virtual viewpoint within the virtual environment. This viewpoint shift causes the second shape (e.g., the black 2D wall) to no longer fill the entire field of view. The virtual viewer can now essentially look around or past the second shape to the first shape (e.g., the white sphere), where the interior surface of the first shape can be seen. The virtual environment generating software sends the updated virtual image back to the HMD 106 software. The HMD 106 software populates the updated virtual image on the HMD 106 screens, changing part of the pixels of the HMD 106 from the color of the second shape (e.g., black) to the color of the first shape (e.g., white). As a result, the overall luminance of the HMD 106 display screen(s) will increase.

The light sensor 608 registers the increase in luminance caused by the white pixels and alters the signal to the DAQ 610 accordingly. The DAQ 610 records the change in light sensor 608 signal and the transition is marked as HMD 106 movement response. The DAQ 610 outputs a data file containing the sensor signals recorded at a high rate. The data may then be analyzed, and the time of movement initiation compared to the time of movement response. The difference in time represents the delay in rendering changes to the virtual environment and system lag. The testing may then be repeated for each degree of freedom in turn.

Based on the testing described above, a less expensive and less complex test stand that does not require electrical power may be utilized saving expense of testing. Additionally, the testing requires far less expensive and easier to source sensor equipment, less complex virtual test components, less complex data analysis that does not require proprietary software, and allows for test results to be confirmed by human analysis.

In some embodiments, a test procedure is determined to have a failed test result in a circumstance where, for any particular degree of freedom of the test stand 604, the difference between the DAQ 610 recorded movement initiation time and the DAQ 610 recorded movement response time are not within required threshold(s). In some embodiments, a test procedure is determined to have a passed test result in a circumstance where, for any particular degree of freedom of the test stand 604, the difference between the DAQ 610 recorded movement initiation time and the DAQ 610 recorded movement response time are within required threshold(s).

Figure 7:
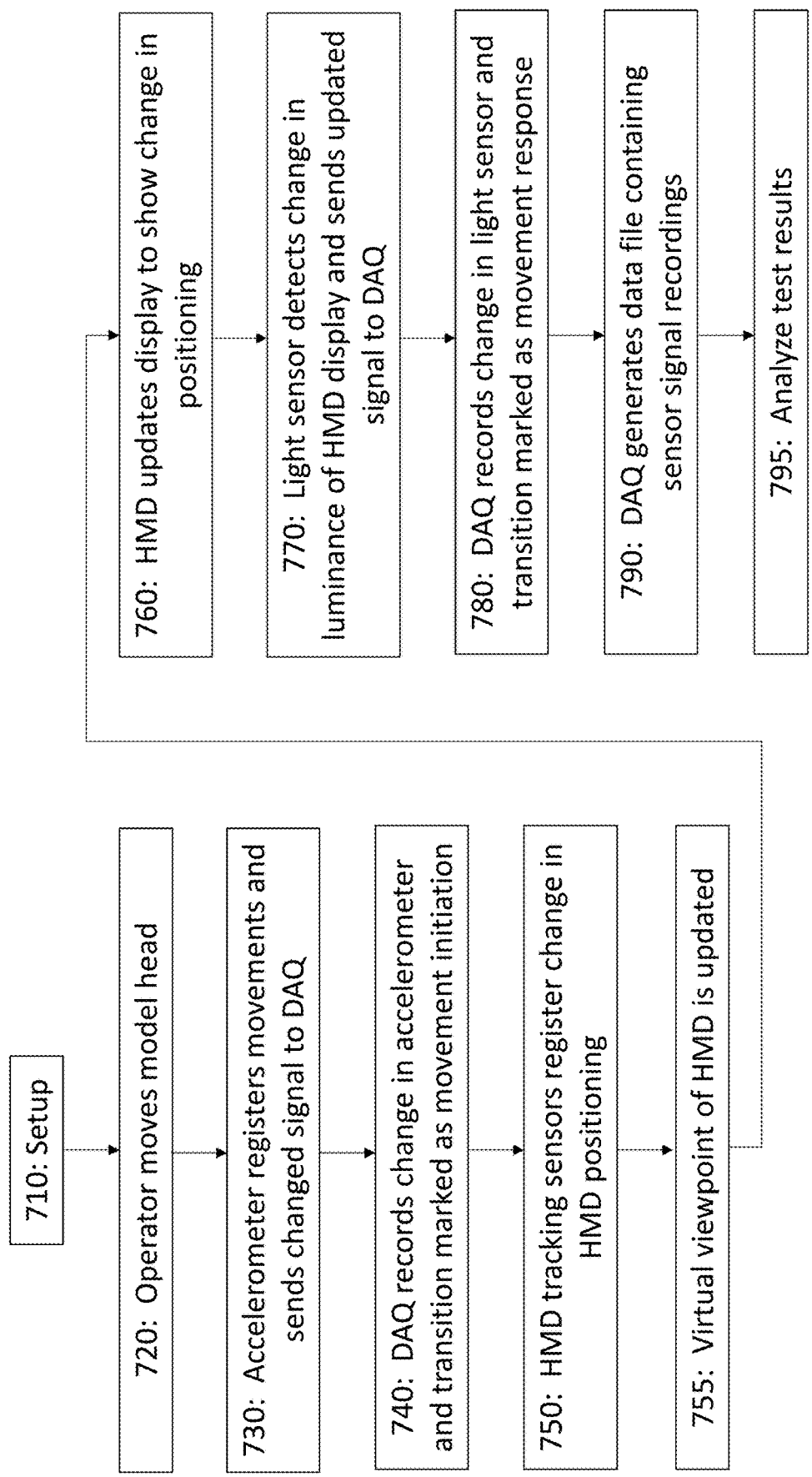
FIG. 7 is a flowchart depicting operations of an example process for measuring the signal time delay between movement of a HMD and corresponding movement of the virtual viewpoint within a virtual scene, in accordance with at least one aspect of the disclosure.

FIG. 7 illustrates a flowchart depicting operations of an example process for measuring the signal time delay between movement of a HMD and corresponding movement of the virtual viewpoint within a virtual scene, in accordance with at least one aspect of the disclosure.

In block 710, the system is set up to prepare for the test. Set up includes, positioning the model head and test stand at the intended location of HMD operation. All surrounding HMD tracking sensors must be installed at their intended locations or temporarily installed in a way that maintains their intended spatial relationship to the HMD. The model head is positioned on the test stand at the center of travel of all six degrees of freedom of the test stand. Movement in all six degrees of freedom is then locked except for the degree of freedom that is to be tested. The virtual environment is generated with a first shape (e.g., a white sphere) surrounding the virtual viewpoint and a second shape (e.g., a black surface) directly in front of the virtual viewpoint, precisely filling the virtual field of view. The virtual image displayed on the HMD screens shows only the second shape (e.g., the black surface), making the screens of the HMD have a first luminance. The light sensor is aimed at the HMD screens from the model head's eyepoint and registers the first luminance from the HMD screens displaying the second shape only. In some embodiments the light sensor continuously sends a corresponding signal to the high-rate DAQ related to the luminance of the HMD screens. The accelerometer inside the model head registers only acceleration due to the gravity vector and continuously sends a corresponding signal to the DAQ corresponding to the stationary position of the model head. In some embodiments data collection by the DAQ may be started, and a data file continuously written to with sampled light sensor and accelerometer data points having a time stamp associated with each sample.

In block 720, a human operator moves the model head from a first position to a second position along the unlocked degree of freedom of the test stand. The movement of the model head may generate acceleration within the model head greater than the minimum measurement capacity of the accelerometer 606. In some embodiments, the movement of the model head may generate accelerations measured by the accelerometer 606 greater than 0.25G. In some embodiments, the rate of movement by the operator may be a factor in determining if the test is valid.

In block 730, the accelerometer registers the acceleration caused by movement of the model head and alters the signal to the DAQ accordingly. In some embodiments, the signal to the DAQ may be a discrete signal when the accelerometer detects the change in position of the model head beyond a threshold movement.

In block 740, the DAQ records the change in accelerometer signal and the transition is marked as movement initiation. In some embodiments, the marking of the transition as movement initiation may be based on a threshold change in the accelerometer signal. In some embodiments, the threshold change in the accelerometer signal may be based on a signal-to-noise (SN) characteristic of the accelerometer. In some embodiments, the marking of the transition as movement initiation may be performed during analysis after the data file is generated by the DAQ and after the test has been completed.

In block 750, the system updates the virtual viewpoint of the HMD. One or more HMD tracking sensors will also register the model head movement as a change in distance to the HMD. The HMD tracking sensors send a signal containing this data to the HMD and/or the system. HMD or system software may then convert the data into a new real-world spatial position of the HMD and send that information to the virtual environment generating software.

In block 755, the virtual environment generating software adjusts the spatial position of the virtual viewpoint within the virtual environment. This viewpoint shift causes the second shape to no longer fill the entire field of view as calculated by the virtual environment generating software. The virtual viewpoint is determined to essentially look around or past the second shape and portions of the first shape may be determined to be visible from the new virtual viewpoint. The virtual environment generating software sends data indicating the updated virtual image back to the HMD software.

In block 760, the HMD receives the data indicating the updated virtual image to reflect the new viewpoint, and updates the displays of the HMD accordingly. The HMD software populates the updated virtual image on the HMD screens, changing some or all of the pixels from the color of the second shape (e.g., black) to the color of the first shape (e.g., white). Since the first shape no longer completely fills the virtual point of view, and the first shape and the second shape have different luminance levels when displayed, the overall luminance of the HMD displays will change.

In block 770, the light sensor detects the change in overall luminance of the HMD displays and alters the signal to the DAQ. In some embodiments, the light sensor signal to the DAQ may be a discrete signal when the light sensor detects the change in luminance of the HMD displays beyond a threshold amount.

In block 780, the DAQ records the change in the light sensor signal and the transition is marked as movement response. In some embodiments, the marking of the transition as movement response may be based on a threshold change in the light sensor signal. In some embodiments, the threshold change in the light sensor signal may be based on a signal-to-noise (SN) characteristic of the light sensor. In some embodiments, the marking of the transition as movement response may be performed during analysis after the data file is generated by the DAQ and after the test has been completed.

In block 790, the DAQ outputs a data file containing information encoding the sensor signals values sampled at a high rate. The data rate may be between 10 and 100,000 Hz. The data file may be a text document, an extensible markup language (XML) file, an EXCEL™ file, a comma separated list, a data file containing information encoding the data in proprietary or opensource data structures, or any other suitable forms of storing the sampled sensor signals. In some embodiments, each sample signal has a timestamp associated with the sample for reconstruction. In some embodiments, the sampling rate may be provided in the data file.

In block 795, the data file may then be analyzed, and the time of movement initiation compared to the time of movement response. The difference in time represents the signal delay in representing movement of the HMD in the virtual environment. The testing method can be repeated for each degree of freedom in turn. In some embodiments, the DAQ may send the data file to the system for analysis. In some embodiments, the data file may be retrieved or sent from the DAQ and loaded into an independent computer or display terminal for analysis.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a transmission configuration determining unit/module and/or a sequence transmitting unit/module. The respective units/modules may be hardware, software, or a combination thereof. For instance, one or more of the units/modules may be an integrated circuit, such as field programmable gate arrays (FPGAs) or application-specific integrated circuits (ASICs).

In accordance with a first aspect of the disclosure, a method is provided. An example method includes generating a virtual environment of a test scenario for a head mounted display (HMD) mounted to a model head on a test stand, where the virtual environment includes at least a first shape and a second shape, where the first shape is a sphere surrounding a first virtual viewpoint and the second shape is a shape that precisely fills a virtual field of view from the first virtual viewpoint, and the virtual viewpoint of the virtual environment is configured to shift in response to movement of the HMD secured to the model head, moving the model head on the test stand along a first degree of freedom from a starting position to a final position, receiving, by a data acquisition system (DAQ), from an accelerometer mounted on the model head, changed signaling indicating the movement of the model head, updating the virtual viewpoint of the HMD based on the movement of the model head, displaying the updated virtual viewpoint in the HMD, receiving, by the DAQ, from a light sensor mounted on the model head, changed signaling based on displaying the updated virtual viewpoint in the HMD, and generating, by the DAQ, a data file encoding the signaling from the accelerometer and the light sensor.

In some embodiments, the method further includes performing, before moving the model head on the test stand along the first degree of freedom from the starting position to the final position, sampling, by the DAQ signaling from the light sensor, based on a first luminance of the HMD related to the second shape. In some embodiments, the method further includes performing, before moving the model head on the test stand along the first degree of freedom from the starting position to the final position, sampling, by the DAQ signaling from the accelerometer, based on a first position of the model head at rest. In some embodiments, the method further includes, marking a movement initiation time based on receiving, by the DAQ, changed signaling indicating the movement of the model head from the accelerometer mounted on the model head. In some embodiments, the method further includes, marking a movement response time based on receiving, by the DAQ, from the light sensor mounted on the model head, changed signaling indicating based on displaying the updated virtual viewpoint in the HMD. In some embodiments, the method further includes determining a difference between the movement initiation time and the movement response time, and determining a delay in representing movement in the virtual environment based on determining the difference between the movement initiation time and the movement response time. In some embodiments, the accelerometer is a triaxial accelerometer. In some embodiments, the accelerometer is one of a piezoelectric, capacitive, or microelectromechanical systems (MEMS) type accelerometer. In some embodiments, the light sensor is one of a photoresistor, a light-dependent resistor (LDR), a photodiode, or a phototransistor. In some embodiments, a luminance of the first shape is greater than 30000 candela per square meter ($cd/m^2$) based on only the first shape being displayed in the HMD. In some embodiments, a luminance of the second shape is less than 1000 candela per square meter ($cd/m^2$) based on only the first shape being displayed in the HMD. In some embodiments, the first shape is of a first color and the second shape is of a second color, where the first color and the second color are visually distinguishable, and where a luminance difference between displaying only the first shape in the HMD and only the second shape in the HMD is greater than 15000 candela per square meter ($cd/m^2$). In some embodiments, the test stand is fixedly moveable only along a test axis.

In a second aspect of the disclosure an apparatus is provided. An example apparatus includes one or more processors, and at least one non-transitory computer readable memory connected to the one or more processors and including computer program code, where the at least one non-transitory computer readable memory and the computer program code are configured, with the one or more processors, to cause the apparatus to at least, generate a virtual environment for a head mounted display (HMD) mounted to a model head on a test stand, where the virtual environment includes at least a first shape and a second shape, where the first shape is a sphere surrounding a first virtual viewpoint and the second shape is a shape that precisely fills a virtual field of view from the first virtual viewpoint, and the virtual viewpoint of the virtual environment is configured to shift in response to movement of the HMD secured to the model head, receive, by a data acquisition system (DAQ), from an accelerometer mounted on the model head, based on movement of the model head on the test stand along a first degree of freedom from a starting position to a final position, changed signaling indicating the movement of the model head, update the virtual viewpoint of the HMD based on the movement of the model head, display the updated virtual viewpoint in the HMD, receive, by the DAQ, from a light sensor mounted on the model head, changed signaling based on displaying the updated virtual viewpoint in the HMD, and generate, by the DAQ, a data file encoding the signaling from the accelerometer and the light sensor.

In some embodiments, the apparatus further includes instruction for, before causing the apparatus to receive, by the DAQ, from the accelerometer mounted on the model head, based on movement of the model head on the test stand along the first degree of freedom from the starting position to the final position, changed signaling indicating the movement of the model head, sample, by the DAQ signaling from the light sensor, based on a first luminance of the HMD related to the second shape, and sample, by the DAQ signaling from the accelerometer, based on a first position of the model head at rest. In some embodiments, the apparatus further includes instruction to mark a movement initiation time based on receiving, by the DAQ, from the accelerometer mounted on the model head, changed signaling indicating the movement of the model head, and mark a movement response time based on receiving, by the DAQ, from the light sensor mounted on the model head, changed signaling indicating based on displaying the updated virtual viewpoint in the HMD. In some embodiments, the apparatus further includes instruction to determine a difference between the movement initiation time and the movement response time, and determine a delay in representing movement in the virtual environment based on determining the difference between the movement initiation time and the movement response time.

In a third aspect of the disclosure, a non-transitory computer-readable storage medium is provided. In some examples, the non-transitory computer-readable storage medium includes has computer program instructions stored on it that, when executed by at least one processor, causes a device to perform generating a virtual environment for a head mounted display (HMD) mounted to a model head on a test stand, where the virtual environment includes at least a first shape and a second shape, where the first shape is a sphere surrounding a first virtual viewpoint and the second shape is a shape that precisely fills a virtual field of view from the first virtual viewpoint, and the virtual viewpoint of the virtual environment is configured to shift in response to movement of the HMD secured to the model head, receiving, by a data acquisition system (DAQ), from an accelerometer mounted on the model head, based on movement of the model head on the test stand along a first degree of freedom from a starting position to a final position, changed signaling indicating the movement of the model head, updating the virtual viewpoint of the HMD based on the movement of the model head, displaying the updated virtual viewpoint in the HMD, receiving, by the DAQ, from a light sensor mounted on the model head, changed signaling based on displaying the updated virtual viewpoint in the HMD, and generating, by the DAQ, a data file encoding the signaling from the accelerometer and the light sensor.

In some embodiments, the non-transitory computer-readable storage medium further includes instruction to, before receiving, by the DAQ, from the accelerometer mounted on the model head, based on movement of the model head on the test stand along the first degree of freedom from the starting position to the final position, changed signaling indicating the movement of the model head, sample, by the DAQ signaling from the light sensor, based on a first luminance of the HMD related to the second shape, and sample, by the DAQ signaling from the accelerometer, based on a first position of the model head at rest. In some embodiments, the non-transitory computer-readable storage medium further includes instruction to mark a movement initiation time based on receiving, by the DAQ, from the accelerometer mounted on the model head, changed signaling indicating the movement of the model head, mark a movement response time based on receiving, by the DAQ, from the light sensor mounted on the model head, changed signaling indicating based on displaying the updated virtual viewpoint in the HMD, determine a difference between the movement initiation time and the movement response time, and determine a delay in representing movement in the virtual environment based on determining the difference between the movement initiation time and the movement response time.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
    generating a virtual environment of a test scenario for a head mounted display (HMD) mounted to a model head on a test stand, wherein the virtual environment comprises at least a first shape and a second shape, wherein the first shape is a sphere surrounding a first virtual viewpoint and the second shape is a shape that precisely fills a virtual field of view from the first virtual viewpoint, and the first virtual viewpoint of the virtual environment is configured to shift in response to movement of the HMD secured to the model head;
    sampling, by a data acquisition system (DAQ), signaling from a light sensor mounted on the model head based on a first luminance of the HMD related to the second shape;
    moving, after the sampling, the model head on the test stand along a first degree of freedom from a starting position to a final position;
    receiving, by the DAQ, from an accelerometer mounted on the model head, changed signaling indicating the movement of the model head;
    updating the first virtual viewpoint of the HMD based on the movement of the model head;
    displaying the updated virtual viewpoint in the HMD;
    receiving, by the DAQ, from the light sensor, changed signaling based on displaying the updated virtual viewpoint in the HMD; and generating, by the DAQ, a data file encoding the signaling from the accelerometer and the light sensor.

2. The method according to claim 1, further comprising performing, before moving the model head on the test stand along the first degree of freedom from the starting position to the final position:
sampling, by the DAQ signaling from the accelerometer, based on a first position of the model head at rest.

3. The method according to claim 1, further comprising:
marking a movement initiation time based on receiving, by the DAQ, changed signaling indicating the movement of the model head from the accelerometer mounted on the model head.

4. The method according to claim 3, further comprising:
marking a movement response time based on receiving, by the DAQ, from the light sensor mounted on the model head, changed signaling indicating based on displaying the updated virtual viewpoint in the HMD.

5. The method according to claim 4, further comprising:
determining a difference between the movement initiation time and the movement response time; and
determining a delay in representing movement in the virtual environment based on determining the difference between the movement initiation time and the movement response time.

6. The method according to claim 1, wherein the accelerometer is a triaxial accelerometer.

7. The method according to claim 1, wherein the accelerometer is one of a piezoelectric, capacitive, or microelectromechanical systems (MEMS) type accelerometer.

8. The method according to claim 1, wherein the light sensor is one of a photoresistor, a light-dependent resistor (LDR), a photodiode, or a phototransistor.

9. The method according to claim 1, wherein a luminance of the first shape is greater than 30000 candela per square meter ($cd/m^2$) based on only the first shape being displayed in the HMD.

10. The method according to claim 1, wherein a luminance of the second shape is less than 1000 candela per square meter ($cd/m^2$) based on only the first shape being displayed in the HMD.

11. The method according to claim 1, wherein the first shape is of a first color and the second shape is of a second color, wherein the first color and the second color are visually distinguishable, and wherein a luminance difference between displaying only the first shape in the HMD and only the second shape in the HMD is greater than 15000 candela per square meter ($cd/m^2$).

12. The method according to claim 1, wherein the test stand is fixedly moveable only along a test axis.

13. An apparatus comprising:
one or more processors; and
at least one non-transitory computer readable memory connected to the one or more processors and including computer program code, wherein the at least one non-transitory computer readable memory and the computer program code are configured, with the one or more processors, to cause the apparatus to at least:
generate a virtual environment for a head mounted display (HMD) mounted to a model head on a test stand, wherein the virtual environment comprises at least a first shape and a second shape, wherein the first shape is a sphere surrounding a first virtual viewpoint and the second shape is a shape that precisely fills a virtual field of view from the first virtual viewpoint, and the first virtual viewpoint of the virtual environment is configured to shift in response to movement of the HMD secured to the model head;
sample, by a data acquisition system (DAQ), signaling from a light sensor mounted on the model head based on a first luminance of the HMD related to the second shape;
receive, by the DAQ, after sampling the signaling, from an accelerometer mounted on the model head, based on movement of the model head on the test stand along a first degree of freedom from a starting position to a final position, changed signaling indicating the movement of the model head;
update the virtual viewpoint of the HMD based on the movement of the model head;
display the updated virtual viewpoint in the HMD;
receive, by the DAQ, from the light sensor, changed signaling based on displaying the updated virtual viewpoint in the HMD; and
generate, by the DAQ, a data file encoding the signaling from the accelerometer and the light sensor.

14. The apparatus according to claim 13, wherein the at least one non-transitory computer readable memory and the computer program code are further configured, with the one or more processors, to cause the apparatus to, before causing the apparatus to receive, by the DAQ, from the accelerometer mounted on the model head, based on movement of the model head on the test stand along the first degree of freedom from the starting position to the final position, changed signaling indicating the movement of the model head:
sample, by the DAQ signaling from the accelerometer, based on a first position of the model head at rest.

15. The apparatus according to claim 13, wherein the instructions further include instruction to:
mark a movement initiation time based on receiving, by the DAQ, from the accelerometer mounted on the model head, changed signaling indicating the movement of the model head; and
mark a movement response time based on receiving, by the DAQ, from the light sensor mounted on the model head, changed signaling indicating based on displaying the updated virtual viewpoint in the HMD.

16. The apparatus according to claim 15, wherein the instructions further include instruction to:
determine a difference between the movement initiation time and the movement response time; and
determine a delay in representing movement in the virtual environment based on determining the difference between the movement initiation time and the movement response time.

17. A non-transitory computer-readable storage medium having computer program instructions stored thereon that, when executed by at least one processor, causes a device to perform:
generating a virtual environment for a head mounted display (HMD) mounted to a model head on a test stand, wherein the virtual environment comprises at least a first shape and a second shape, wherein the first shape is a sphere surrounding a first virtual viewpoint and the second shape is a shape that precisely fills a virtual field of view from the first virtual viewpoint, and the first virtual viewpoint of the virtual environment is configured to shift in response to movement of the HMD secured to the model head;

sample, by a data acquisition system (DAQ), signaling from a light sensor mounted on the model head, based on a first luminance of the HMD related to the second shape;

receiving, by the DAQ, after sampling the signaling, from an accelerometer mounted on the model head, based on movement of the model head on the test stand along a first degree of freedom from a starting position to a final position, changed signaling indicating the movement of the model head;

updating the virtual viewpoint of the HMD based on the movement of the model head;

displaying the updated virtual viewpoint in the HMD;

receiving, by the DAQ, from the light sensor, changed signaling based on displaying the updated virtual viewpoint in the HMD; and generating, by the DAQ, a data file encoding the signaling from the accelerometer and the light sensor.

18. The non-transitory computer-readable storage medium according to claim 17, wherein the instructions further include instruction that, when executed by at least one processor, causes the device to perform, before receiving the changed signaling indicating the movement of the model head:

sample, by the DAQ signaling from the accelerometer, based on a first position of the model head at rest.

19. The at least one non-transitory computer-readable storage medium according to claim 17, wherein the instructions further include instruction to that when executed by at least one processor, causes the device to perform:

marking a movement initiation time based on receiving, by the DAQ, from the accelerometer mounted on the model head, changed signaling indicating the movement of the model head;

marking a movement response time based on receiving, by the DAQ, from the light sensor mounted on the model head, changed signaling indicating based on displaying the updated virtual viewpoint in the HMD;

determining a difference between the movement initiation time and the movement response time; and determining a delay in representing movement in the virtual environment based on determining the difference between the movement initiation time and the movement response time.

\* \* \* \* \*